(12) United States Patent
Tomi et al.

(10) Patent No.: US 11,757,118 B2
(45) Date of Patent: Sep. 12, 2023

(54) FUEL CELL SYSTEM AND METHOD OF CONTROLLING FUEL CELL

(71) Applicant: TOYOTA JIDOSHA KABUSHIKI KAISHA, Toyota (JP)

(72) Inventors: Naoki Tomi, Nagoya (JP); Shigeki Hasegawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 17/243,661

(22) Filed: Apr. 29, 2021

(65) Prior Publication Data

US 2021/0376360 A1 Dec. 2, 2021

(30) Foreign Application Priority Data

May 29, 2020 (JP) .................................. 2020-094398

(51) Int. Cl.
*H01M 8/04082* (2016.01)
*H01M 8/04746* (2016.01)
*H01M 8/0438* (2016.01)
*H01M 8/04992* (2016.01)
*H01M 8/04111* (2016.01)

(52) U.S. Cl.
CPC .... *H01M 8/04992* (2013.01); *H01M 8/04111* (2013.01); *H01M 8/04201* (2013.01); *H01M 8/04753* (2013.01); *H01M 8/04783* (2013.01); *H01M 2250/20* (2013.01)

(58) Field of Classification Search
CPC .......... H01M 8/04992; H01M 8/04111; H01M 8/04201; H01M 8/04753; H01M 8/04783; H01M 2250/20; H01M 8/04388; H01M 8/04432; H01M 8/04761; Y02E 60/50; Y02T 90/40
USPC ....................................................... 426/446
See application file for complete search history.

(56) References Cited

U.S. PATENT DOCUMENTS

2009/0098426 A1* 4/2009 Tsuchiya ............. H01M 8/0438
429/410
2019/0260048 A1 8/2019 Tomi et al.

FOREIGN PATENT DOCUMENTS

JP 2019145337 A 8/2019

\* cited by examiner

*Primary Examiner* — Christian Roldan
(74) *Attorney, Agent, or Firm* — Dickinson Wright, PLLC (57) ABSTRACT

A fuel cell system 1 is provided with a fuel cell 10 provided with an air passage 10$a$, an air inflow path 21, an air outflow path 23, a compressor 22, a pressure regulating valve 24, a bypass passage 27, and a bypass valve 28. A first threshold value is calculated based on an FC inlet pressure-lower limit value. When it is judged that an FC inlet pressure-command value is lower than the first threshold value, feedback control of the opening degree of the pressure regulating valve is suspended without suspending feedback control of the opening degree of the bypass valve if it is judged that the FC pressure loss-lower limit value is larger than the bypass pressure loss-lower limit value, and feedback control of the opening degree of the bypass valve is suspended without suspending feedback control of the opening degree of the pressure regulating valve if it is judged that the bypass pressure loss-lower limit value is larger than the FC pressure loss-lower limit value.

4 Claims, 5 Drawing Sheets

FUEL CELL SYSTEM AND METHOD OF CONTROLLING FUEL CELL

FIELD

The present disclosure relates to a fuel cell system and a method of controlling a fuel cell.

BACKGROUND

A fuel cell system is known in the art which is provided with a fuel cell including an air passage, an air inflow path connected to an inlet of the air passage, an air outflow path connected to an outlet of the air passage, a compressor arranged in the air inflow path, a pressure regulating valve arranged in the air outflow path, a bypass passage extending from a diverging point on the air inflow path downstream of the compressor to a merging point on the air outflow path downstream of the pressure regulating valve bypassing the fuel cell, a bypass valve arranged in the bypass passage, an FC route running from the diverging point successively through the air inflow path, air passage, and air outflow path including the pressure regulating valve to reach the merging point, and a bypass route running from the diverging point through the bypass air passage including the bypass valve to reach the merging point, in which fuel cell system an opening degree of the pressure regulating valve and an opening degree of the bypass valve are respectively feedback controlled (for example, see PTL 1).

CITATIONS LIST

Patent Literature

[PTL 1] Japanese Unexamined Patent Publication No. 2019-145337

SUMMARY

Technical Problem

In general, a pressure loss of a route including a valve depends on an air flow rate of the route and an opening degree of the valve. Specifically, under a constant air flow rate, the pressure loss becomes smaller the larger the opening degree of the valve. When the opening degree of the valve is the maximum opening degree, the pressure loss becomes the minimum value or the lower limit value. In other words, the pressure loss cannot be made smaller than the minimum value or the lower limit value. Therefore, the inlet pressure of the route cannot be made lower than a pressure-lower limit value which is a total of the outlet pressure and the lower limit value of the pressure loss. For this reason, if a command value of the inlet pressure of the route is lower than the pressure-lower limit value, that command cannot be realized.

In PTL 1, the pressure-lower limit value is determined in accordance with the lower limit value of the pressure loss of the FC route and the lower limit value of the pressure loss of the bypass route. If the command value of the pressure of the diverging point is lower than the pressure-lower limit value, that command cannot be realized.

Although details will be explained later, when in this way the command value of the pressure of the diverging point is lower than the pressure-lower limit value, if the opening degree of the pressure regulating valve or the opening degree of the bypass valve continues to be feedback controlled, the following feedback control may not be accurately performed.

Solution to Problem

According to the present disclosure, the following are provided:

[Constitution 1]

A fuel cell system comprising:
a fuel cell including an air passage;
an air inflow path connected to an inlet of the air passage;
an air outflow path connected to an outlet of the air passage;
a compressor arranged in the air inflow path;
a pressure regulating valve arranged in the air outflow path;
a bypass passage extending from a diverging point on the air inflow path downstream of the compressor to a merging point on the air outflow path downstream of the pressure regulating valve bypassing the fuel cell;
a bypass valve arranged in the bypass passage;
an FC route running from the diverging point successively through the air inflow path, air passage, and air outflow path including the pressure regulating valve to reach the merging point;
a bypass route running from the diverging point through the bypass air passage including the bypass valve to reach the merging point; and
an electronic control unit configured to respectively perform at least feedback control of an opening degree of the pressure regulating valve and feedback control of an opening degree of the bypass valve so that an FC air flow rate which is a flow rate of air of the FC route, a bypass air flow rate which is a flow rate of air of the bypass route, and an FC inlet pressure which is a pressure at the diverging point, are respectively equal to an FC air flow rate-command value, bypass air flow rate-command value, and FC inlet pressure-command value,
wherein the electronic control unit further configured to:
calculate a first threshold value based on an FC inlet pressure-lower limit value which is a lower limit value of the FC inlet pressure when the FC air flow rate and the bypass air flow rate are respectively equal to the FC air flow rate-command value and the bypass air flow rate-command value;
when it is judged that the FC inlet pressure-command value is lower than the first threshold value,
suspend feedback control of the opening degree of the pressure regulating valve without suspending feedback control of the opening degree of the bypass valve if it is judged that an FC pressure loss-lower limit value is larger than a bypass pressure loss-lower limit value, the FC pressure loss-lower limit value being a lower limit value of the pressure loss of the FC route when the FC air flow rate is equal to the FC air flow rate-command value, and the bypass pressure loss-lower limit value being a lower limit value of the pressure loss of the bypass route when the bypass air flow rate is equal to the bypass air flow rate-command value; and
suspend feedback control of the opening degree of the bypass valve without suspending feedback control of the opening degree of the pressure regulating valve if it is judged that the bypass pressure loss-lower limit value is larger than the FC pressure loss-lower limit value.

[Constitution 2]

The fuel cell system according to Constitution 1 wherein the first threshold value is calculated based on a total of:
the larger of the FC pressure loss-lower limit value and the bypass pressure loss-lower limit value;
the pressure loss of the air outflow path from the merging point to the outlet when the FC air flow rate and the bypass air flow rate are respectively equal to the FC air flow rate-command value and the bypass air flow rate-command value; and
a predetermined margin value.

[Constitution 3]

The fuel cell system according to Constitution 1 or 2, wherein the feedback control of the opening degree of the pressure regulating valve includes:
pressure regulating valve air flow rate feedback control in which the opening degree of the pressure regulating valve is feedback controlled so that a pressure regulating valve-air flow rate is equal to a pressure regulating valve-air flow rate-command value, the pressure regulating valve-air flow rate being an air flow rate of the pressure regulating valve; and
pressure regulating valve-pressure ratio feedback control in which the opening degree of the pressure regulating valve is feedback controlled so that a pressure regulating valve-pressure ratio is equal to a pressure regulating valve-pressure ratio-command value, the pressure regulating valve-pressure ratio being a ratio of an inlet pressure and outlet pressure of the pressure regulating valve;
the feedback control of the opening degree of the bypass valve includes:
bypass valve-air flow rate feedback control in which the opening degree of the bypass valve is feedback controlled so that a bypass valve-air flow rate is equal to a bypass valve-air flow rate-command value, the bypass valve-air flow rate being an air flow rate of the bypass valve; and
bypass valve-pressure ratio feedback control in which the opening degree of the bypass valve is feedback controlled so that a bypass valve-pressure ratio is equal to a bypass valve pressure ratio-command value, the bypass valve-pressure ratio being a ratio of an inlet pressure and outlet pressure of the bypass valve;
wherein the pressure regulating valve-air flow rate-command value, the pressure regulating valve pressure ratio, the bypass valve-air flow rate-command value, and the bypass valve-pressure ratio respectively are calculated based on at least the FC air flow rate-command value and the bypass air flow rate-command value, and
wherein the electronic control unit is further configured to:
when it is judged that the FC inlet pressure-command value is lower than the first threshold value,
execute the bypass valve-air flow rate feedback control while suspending the bypass valve-pressure ratio feedback control if it is judged that the FC pressure loss-lower limit value is larger than the bypass pressure loss-lower limit value; and
execute the pressure regulating valve-air flow rate feedback control while suspending the pressure regulating valve pressure ratio feedback control if it is judged that the bypass pressure loss-lower limit value is larger than the FC pressure loss-lower limit value.

[Constitution 4]

The fuel cell system according to any one of Constitutions 1 to 3, wherein the electronic control unit is further configured to:
calculate a second threshold value based on the FC inlet pressure-lower limit value; and
when it is judged that the FC inlet pressure-command value is lower than the second threshold value,
fix the opening degree of the pressure regulating valve at its maximum opening degree if it is judged that the FC pressure loss-lower limit value is larger than the bypass pressure loss-lower limit value and
fix the opening degree of the bypass valve at its maximum opening degree if it is judged that the bypass pressure loss-lower limit value is larger than the FC pressure loss-lower limit value.

[Constitution 5]

A method of controlling a fuel cell system, the fuel cell system comprising:
a fuel cell including an air passage;
an air inflow path connected to an FC inlet of the air passage;
an air outflow path connected to an outlet of the air passage;
a compressor arranged in the air inflow path;
a pressure regulating valve arranged in the air outflow path;
a bypass passage extending from a diverging point on the air inflow path downstream of the compressor to a merging point on the air outflow path downstream of the pressure regulating valve bypassing the fuel cell;
a bypass valve arranged in the bypass passage;
an FC route running from the diverging point successively through the air inflow path, air passage, and air outflow path including the pressure regulating valve to reach the merging point; and
a bypass route running from the diverging point through the bypass air passage including the bypass valve to reach the merging point,
the method comprising respectively performing at least feedback control of an opening degree of the pressure regulating valve and feedback control of an opening degree of the bypass valve so that an FC air flow rate of a flow rate of air of the FC route, a bypass air flow rate of a flow rate of air of the bypass route, and an FC inlet pressure of a pressure at the diverging point respectively are equal to an FC air flow rate-command value, bypass air flow rate-command value, and FC inlet pressure-command value,
the method further comprising:
calculating a first threshold value based on an FC inlet pressure-lower limit value which is a lower limit value of the FC inlet pressure when the FC air flow rate and the bypass air flow rate are respectively equal to the FC air flow rate-command value and the bypass air flow rate-command value;
when it is judged that the FC inlet pressure-command value is lower than the first threshold value,
suspending feedback control of the opening degree of the pressure regulating valve without suspending feedback control of the opening degree of the bypass valve if it is judged that an FC pressure loss-lower limit value is larger than a bypass pressure loss-lower limit value, the FC pressure loss-lower limit value being a lower limit value of the pressure loss of the FC route when the FC air flow rate is equal to the FC air flow rate-command value, and the bypass pressure loss-lower limit value being a lower limit value of the pressure loss of the bypass route when the bypass air flow rate is equal to the bypass air flow rate-command value; and suspending feedback control of the opening degree of the bypass valve without suspending feedback control of the opening degree of the pressure regulating valve if it is judged that the bypass pressure loss-lower limit value is larger than the FC pressure loss-lower limit value.

Advantageous Effects of Invention

It is possible to secure accurate feedback control of an opening degree of a pressure regulating valve and an opening degree of a bypass valve.

DESCRIPTION OF EMBODIMENTS

Figure 1:
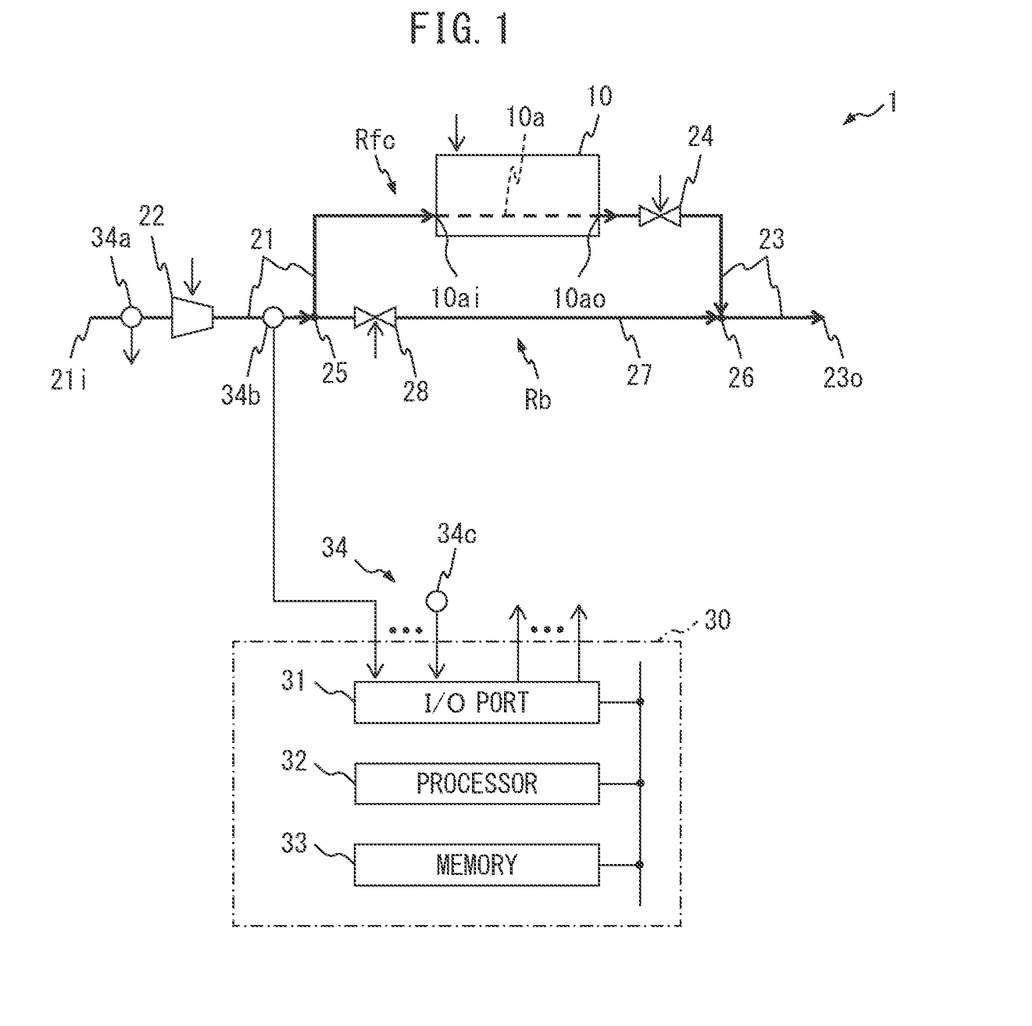
FIG. 1 is a schematic overall view of a fuel cell system of an embodiment according to the present disclosure.

Referring to FIG. 1, in an embodiment according to the present disclosure, a fuel cell system 1 is provided with a fuel cell 10. The fuel cell 10 is formed by a plurality of unit cells stacked together. The fuel cell 10 is provided with an air passage 10a, hydrogen passage (not shown), and cooling water passage (not shown). In one example, the fuel cell system 1 is mounted in a vehicle.

In an embodiment according to the present disclosure, the air passage 10a extends inside the fuel cell 10 from an inlet 10a i to an outlet 10ao. At the inlet 10ai, an air inflow path 21 is connected. The inlet of the air inflow path 21 is open to the atmosphere. In the air inflow path 21, a compressor 22 is arranged. On the other hand, at the outlet 10ao, an air outflow path 23 is connected. The outlet 23o of the air outflow path 23 is open to the atmosphere. In the air outflow path 23, a pressure regulating valve 24 of a solenoid type is arranged. A diverging point 25 downstream of the compressor 22 on the air inflow path 21 and a merging point 26 downstream of the pressure regulating valve 24 on the air outflow path 23 are connected with each other by a bypass passage 27 bypassing the fuel cell 10. In the bypass passage 27, a bypass valve 28 of a solenoid type is arranged.

Inside of the air passage 10a, a cathode (not shown) is arranged. Further, inside of the hydrogen passage, an anode (not shown) is arranged. Furthermore, between the anode and the cathode, a film-shaped electrolyte (not shown) is arranged.

When the fuel cell system 1 is to be operated, the pressure regulating valve 24 is opened, the compressor 22 is actuated, and air or oxygen is supplied to the air passage 10a. Further, hydrogen is supplied to the hydrogen passage. As a result, in the fuel cell 10, an electrochemical reaction ($H_2 \rightarrow 2H^+ + 2e^-$, $(1/2)O_2 + 2H^+ + 2e^- \rightarrow H_2O$) occurs and electric power is generated. This electric power is sent from the fuel cell 10 to a motor-generator (not shown), battery (not shown), etc.

Note that, in an embodiment according to the present disclosure, a route running from the diverging point 25 successively through the air inflow path 21, air passage 10a, and air outflow path 23 including the pressure regulating valve 24 and reaching the merging point 26 is referred to as a "FC route Rfc", and a route running from the diverging point 25 through the bypass passage 27 including the bypass valve 28 and reaching the merging point 26 is referred to as a "bypass route Rbp". If the bypass valve 28 is opened, the air flows through both the FC route Rfc and bypass route Rbp. In this case, the total of the air flow rate of the FC route Rfc and the air flow rate of the bypass route Rbp is equal to the air flow rate from the compressor 22.

The fuel cell system 1 of an embodiment according to the present disclosure is provided with an electronic control unit 30. The electronic control unit 30 for example includes components communicatively connected with each other by a bidirectional bus, such as an input-output port 31, one or more processors 32, and one or more memories 33. A processor 32 includes a microprocessor (CPU) etc. A memory 33 for example includes a ROM (read only memory), RAM (random access memory), etc. In the memory 33, various programs are stored. These programs are run at the processor 32 whereby various routines are executed.

To the input-output port 31, one or more sensors 34 are connected communicatively. The sensors 34 include, for example, an air flow meter 34a for detecting the quantity of air flowing through the air inflow path 21, a pressure sensor 34b for detecting the pressure in the air inflow path 21 between the compressor 22 and the diverging point 25, and an atmospheric pressure sensor 34c for detecting the atmospheric pressure. On the other hand, the input-output port 31 is communicatively connected to the fuel cell 10, compressor 22, pressure regulating valve 24, bypass control valve 28, etc. These fuel cell 10 etc. are controlled based on signals from the electronic control unit 30.

Explained schematically, in an embodiment according to the present disclosure, operation quantities of actuators are respectively controlled to control the control quantities in a feedforward manner and feedback manner, in which the actuators may be:
the compressor 22;
the pressure regulating valve 24; and
the bypass valve 28,
the operation quantities of the actuators may be:
a compressor speed (speed of the compressor 22) Nacp;
a pressure regulating valve-opening degree (opening degree of the pressure regulating valve 24) θARV; and
a bypass valve-opening degree (opening degree of the bypass valve 28) θabv, and the control quantities may be:
a compressor air flow rate (flow rate of air from the compressor 22) Qacp;

an FC air flow rate (flow rate of air flowing through the FC route Rfc) Qfc; and an FC inlet pressure (pressure at diverging point 25 or inlet 10a i of the air passage 10a) Pfc.

Note that, in an embodiment according to the present disclosure, for part of the calculations, a pressure regulating valve-effective cross-sectional area (effective cross-sectional area of pressure regulating valve 24) Ae_arv is used. This is converted to the pressure regulating valve-opening degree θARV. Further, for part of the calculations, a bypass valve-effective cross-sectional area (effective cross-sectional area of bypass valve 28) Ae_abv is used. This is converted to the bypass valve-opening degree θabv.

In an embodiment according to the present disclosure, first, command values of the control quantities are respectively calculated. The command values may be:

a compressor air flow rate-command value Qacp_ref;

an FC air flow rate-command value Qfc_ref; and an FC inlet pressure-command value P_ref.

The command values of the control quantities are for example calculated based on the required output of the fuel cell system 1.

Next, the command values of the control quantities are converted to command values of the state quantities of the actuators.

In an embodiment according to the present disclosure, the state quantity of the compressor 22 is for example expressed by:

a compressor air flow rate Qacp; and a compressor pressure ratio Pracp.

The compressor air flow rate Qacp expresses the flow rate of air running through the compressor 22. On the other hand, the compressor pressure ratio Pracp expresses the ratio (=Po/Pi) of the inlet pressure (Pi) and the outlet pressure (Po) of the compressor 22.

The state quantity of the pressure regulating valve 24 is for example expressed by:

an FC air flow rate Qfc; and a pressure regulating valve pressure ratio Prarv.

The FC air flow rate Qfc expresses the flow rate of air running through the pressure regulating valve 24. On the other hand, the pressure regulating valve-pressure ratio Prary expresses the ratio of the inlet pressure and the outlet pressure of the pressure regulating valve 24.

The state quantity of the bypass valve 28 is for example expressed by:

a bypass air flow rate Qbp; and a bypass valve pressure ratio Prabv.

The bypass air flow rate Qbp expresses the flow rate of air running through the bypass valve 28 and is also expressed as the difference (Qacp-Qfc) between the compressor air flow rate Qacp and FC air flow rate Qfc. On the other hand, the bypass valve-pressure ratio Prabv expresses the ratio of the inlet pressure and the outlet pressure of the bypass valve 28.

In an embodiment according to the present disclosure, the command values of the state quantities of the actuators are calculated as shown below using a coordinate conversion model "f". Note that, the coordinate conversion model "f" is stored in the form of a function or map in advance in the memory 33:

(Qacp_ref, Pracp_ref, Qfc_ref, Prarv_ref, Qbp_ref, Prabv_ref)=f(Qacp_ref, Qfc_ref, Pfc_ref)

Next, for the operation quantities of the actuators, feedback (FB) control deviations between the command values and the current values are respectively calculated.

In an embodiment according to the present disclosure, an FB control deviation ΔNacp of the compressor speed is for example calculated as follows using a deviation (dQacp) between the command value Qacp_ref and the current value Qacp_mes of the compressor air flow rate and a deviation (dPracp) between the command value Pracp_ref and the current value Pracp_mes of the compressor pressure ratio.

$\Delta Nacp = \partial N/\partial Q(dQacp) + \partial N/\partial Pr(dPracp)$ $dQacp = Qacp\_ref - Qacp\_mes$ $dPracp = Pracp\_ref - Pracp\_mes$ An FB control deviation ΔAe_arv of the pressure regulating valve-effective cross-sectional area is for example calculated as follows using the deviation (dQfc) between the command value Qfc_ref and current value Qfc_mes of the pressure regulating valve-air flow rate and the deviation (dPrarv) between the command value Prarv_ref and the current value Prarv_mes of the pressure regulating valve-pressure ratio:

$\Delta Ae\_arv = \partial Ae/\partial Q(dQfc) + \partial Ae/\partial Pr(dPrarv)$ $dQfc = Qfc\_ref - Qfc\_mes$ $dPrary = rarv\_ref - Prarv\_mes$ An FB control deviation ΔAe_abv of the bypass valve-effective cross-sectional area is for example calculated as follows using the deviation (dQbp) between the command value Qbp_ref and current value Qbp_mes of the bypass valve-air flow rate and the deviation (dPrabv) between the command value Prabv ref and current value Prabv_mes of the bypass valve-pressure ratio:

$\Delta Ae\_abv = \partial Ae/\partial Q(dQbp) + \partial Ae/\partial Pr(dPrabv)$ $dQbp = Qbp\_ref - Qbp\_mes$ $dPrabv = Prabv\_ref - Prabv\_mes$ Note that the current values Qacp_mes, Pracp_mes, Qfc_mes, Prarv_mes, Qbp_mes, and Prabv_mes are for example estimated using models or detected by sensors (not shown).

Next, the FB control command values of the operation quantities of the actuators are respectively calculated.

An FB control command value NACP_FB of the compressor speed is for example calculated as follows using the above-mentioned FB control deviation ΔNacp and the proportional gain kp and integral gain ki:

$Nacp\_FB = kp \cdot \Delta Nacp + ki \cdot \int(Nacp)dt$

An FB control command value Ae_arv_FB of the pressure regulating valve-effective cross-sectional area is for example calculated as follows using the above-mentioned FB control deviation ΔAe_arv and proportional gain kp and integral gain ki:

$Ae\_arv\_FB = kp \cdot \Delta Ae\_arv + ki \cdot \int(\Delta Ae\_arv)dt$

An FB control-command value Ae_abv_FB of the bypass valve-effective cross-sectional area is for example calculated as follows using the above-mentioned FB control deviation ΔAe_abv and proportional gain kp and integral gain ki:

$Ae\_abv\_FB = kp \cdot \Delta Ae\_abv + ki \cdot \int(\Delta Ae\_abv)dt$

Next, operation quantity-command values of the actuators are respectively calculated:

A compressor speed-command value Nacp_ref is for example calculated as follows using the above-mentioned FB control-command value Nacp_FB and a feedforward (FF) control command value Nacp_FF:

$Nacp\_ref = Nacp\_FF + Nacp\_FB$

A pressure regulating valve-effective cross-sectional area-command value Ae_arv_ref is for example calculated as follows using the above-mentioned FB control-command value Ae_arv_FB and a feedforw ard (FF) control command value Ae_arv_FF:

$Ae\_arv\_ref = Ae\_arv\_FF + Ae\_arv\_FB$

The pressure regulating valve-effective cross-sectional area-command value Ae_arv_ref is for example converted to a pressure regulating valve-opening degree-command value θarv_ref as follows using a coordinate conversion model farv. The coordinate conversion model farv is stored in the form of a function or map in advance in the memory 33:

θarv_ref=farv(Ae_arv_ref)

A bypass valve-effective cross-sectional area-command value Ae_abv_ref is for example calculated as follows using the above-mentioned FB control-command value Ae_abv_FB and a feedfoward (FF) control command value Ae_abv_FF:

Ae_abv_ref=Ae_abv_FF+Ae_abv_FB

The bypass valve-effective cross-sectional area-command value Ae_abv_ref is for example converted to a bypass valve-opening degree-command value θabv_ref as follows using a coordinate conversion model fabv. The coordinate conversion model fabv is stored in the form of a function or map in advance in the memory 33:

θabv_ref=fabv(Ae_abv_ref)

Note that, explanations of the FF control command values Nacp_FF, Ae_arv_FF, and Ae_abv_FF will be omitted.

Next, the compressor 22 is controlled so that the compressor speed Nacp is equal to the command value Nacp ref. Further, the pressure regulating valve 24 is controlled so that the pressure regulating valve-opening degree θarv is equal to the command value θarv_ref. Furthermore, the bypass valve 28 is controlled so that the bypass valve-opening degree θabv is equal to the command value θabv_ref.

In this way, in an embodiment according to the present disclosure, at least feedback control of the pressure regulating valve-opening degree and feedback control of the bypass valve-opening degree are performed so that the FC air flow rate, bypass air flow rate, and FC inlet pressure respectively is equal to the FC air flow rate-command value, bypass air flow rate-command value, and FC inlet pressure-command value. Further, feedback control of the pressure regulating valve-opening degree includes pressure regulating valve-air flow rate-feedback control in which the pressure regulating valve-opening degree is feedback controlled so that the pressure regulating valve-air flow rate is equal to the pressure regulating valve-air flow rate-command value and pressure regulating valve pressure ratio feedback control in which the pressure regulating valve-opening degree is feedback controlled so that the pressure regulating valve pressure ratio is equal to the pressure regulating valve-pressure ratio-command value. Feedback control of the opening degree of the bypass valve includes bypass valve-air flow rate feedback control in which the bypass valve-opening degree is feedback controlled so that the bypass valve-air flow rate is equal to the bypass valve-air flow rate-command value and bypass valve-pressure ratio feedback control in which the bypass valve-opening degree is feedback controlled so that the bypass valve-pressure ratio is equal to the bypass valve-pressure ratio-command value.

Figure 2:
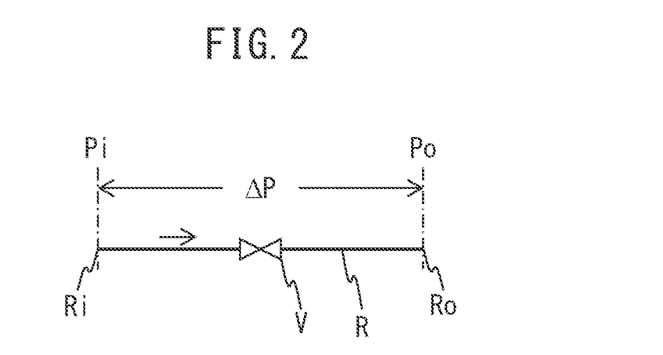
FIG. 2 is a schematic view for explaining a pressure-lower limit value.

Next, a pressure-lower limit value will be explained. Consider the case such as shown in FIG. 2 where air is flowing through a route R including a valve V. In this case, the pressure loss ΔP of the route R depends on the air flow rate of the route R and the opening degree of the valve V. Specifically, under a constant air flow rate, the pressure loss ΔP becomes smaller as the opening degree of the valve V becomes larger. When the opening degree of the valve V is the maximum opening degree, the pressure loss ΔP becomes the minimum value or the lower limit value ΔPmin. In other words, the pressure loss ΔP cannot be made smaller than the minimum value or the lower limit value ΔPmin. Therefore, if the pressure of the inlet Ri of the route R is designated as Pi and the pressure of the outlet Ro of the route R is designated as Po, the inlet pressure Pi cannot be made lower than Po+ΔPmin. In this way, the inlet pressure Pi has a minimum value or lower limit value determined in accordance with the air flow rate. In an embodiment according to the present disclosure, this minimum value or lower limit value is referred to as a pressure-lower limit value. Further, the minimum value or the lower limit value of the pressure loss will be referred to as a pressure loss-lower limit value.

Figure 3:
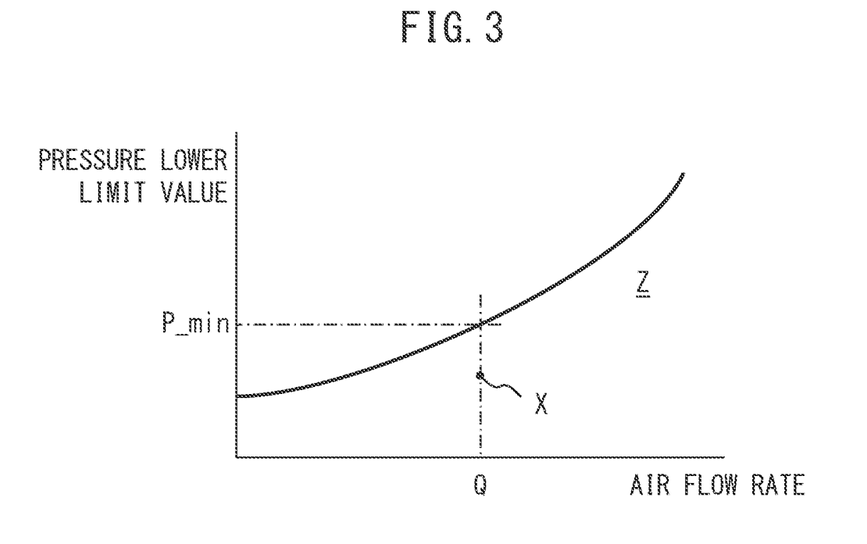
FIG. 3 is a graph showing one example of a stall line.

The line obtained by connecting the pressure-lower limit values at a plurality of air flow rates is called also as a "stall line". In FIG. 3, one example of a stall line is shown. As shown in FIG. 3, the pressure-lower limit value becomes larger as the air flow rate becomes larger.

In FIG. 3, the pressure-lower limit value when the air flow rate is Q is shown by P_min. That is, when the air flow rate is Q, the inlet pressure Pi cannot be made lower than the pressure-lower limit value P_min. In other words, if an operating point X determined by the air flow rate and the inlet pressure falls in a region Z at the lower side from the stall line, that operating point X cannot be realized.

Figure 4:
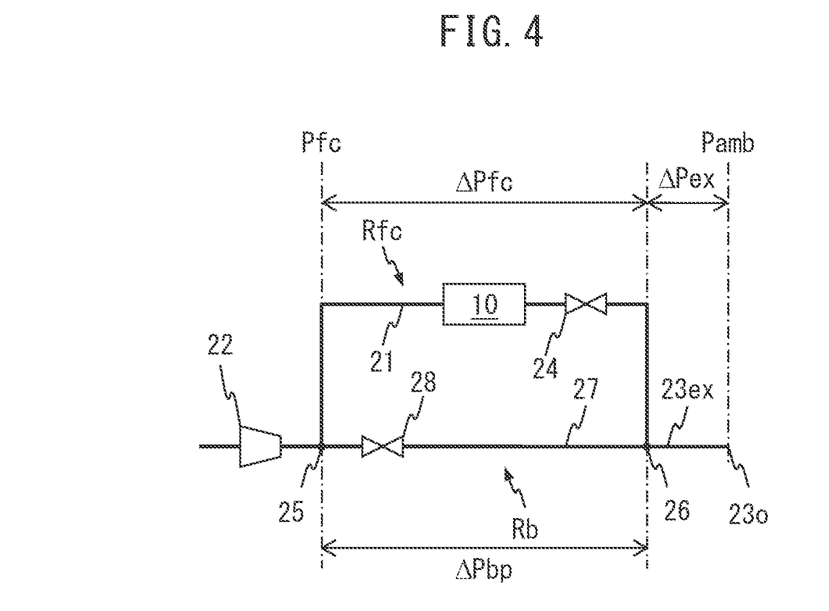
FIG. 4 is a schematic view for explaining an embodiment according to the present disclosure.

Next, referring to FIG. 4, a FC inlet pressure-lower limit value Pfc_min which is the pressure-lower limit value of the FC inlet pressure Pfc, of an embodiment according to the present disclosure, will be explained. In an embodiment according to the present disclosure, as explained above, the FC route Rfc and bypass route Rbp are provided.

First, an FC pressure loss-lower limit value ΔPfc_min, which is the pressure loss-lower limit value of the FC route Rfc when the FC air flow rate Qfc is the FC air flow rate-command value Qfc_ref is for example calculated as follows using a model ffc expressing the relationship between the air flow rate and pressure loss of the FC route Rfc. The model ffc is stored in the form of a function or map in advance in the memory 33:

ΔPfc_min=ffc(Qfc_ref)

Further, a bypass pressure loss-lower limit value ΔPbp_min, which is the pressure loss-lower limit value of the bypass route Rbp when the bypass air flow rate Qbp is the bypass air flow rate-command value Qbp_ref is for example calculated as follows using a model fbp expressing the relationship between the air flow rate and pressure loss of the bypass route Rbp. The model fbp is stored in the form of a function or map in advance in the memory 33:

ΔPbp_min=fbp(Qbp_ref)

When the FC air flow rate Qfc is equal to the FC air flow rate-command value Qfc_ref and the bypass air flow rate Qbp is equal to the bypass air flow rate-command value Qbp_ref, the air flow rate of the air outflow path part 23ex from the merging part 26 to the outlet 23o is equal to (Qfc_ref+Qbp_ref). Therefore, the pressure loss ΔPex of the air outflow path part 23ex is calculated for example as follows using the FC air flow rate-command value Qfc_ref and the bypass air flow rate-command value Qbp_ref, as well as a model fex expressing the relationship between the air flow rate and pressure loss of the air outflow path part 23ex. The model fex is stored in the form of a function or map in advance in the memory 33:

ΔPex=fex(Qfc_ref+Qbp_ref)

Next, the pressure loss-lower limit value ΔP_min between the merging part 26 and outlet 23o of the air outflow path 23 is calculated as follows:

ΔP min=MAX(ΔPfc_min, ΔPbp_min)+ΔPex

Note that MAX(x, y) expresses the function of outputting the larger of x and y.

Therefore, the FC inlet pressure-lower limit value Pfc_min is expressed as follows using the ambient pressure Pamb:

Pfc_min=ΔP_min+Pamb

This being so, in an embodiment according to the present disclosure, if the FC inlet pressure-command value Pfc_ref is smaller than the FC inlet pressure-lower limit value Pfc_min, it is not possible to realize the operating point determined by the command value.

When the FC pressure loss-lower limit value ΔPfc_min is larger than the bypass pressure loss-lower limit value ΔPbp_min, as explained above, the FC inlet pressure-lower limit value Pfc_min is determined based on the FC pressure loss-lower limit value ΔPfc_min. For this reason, the fact that the FC inlet pressure-command value Pfc_ref is smaller than the FC inlet pressure-lower limit value Pfc_min means that the operating point at the FC route Rfc, that is, the operating point determined by the FC air flow rate-command value Qfc_ref and the FC inlet pressure-command value Pfc_ref, cannot be realized.

Figure 5:
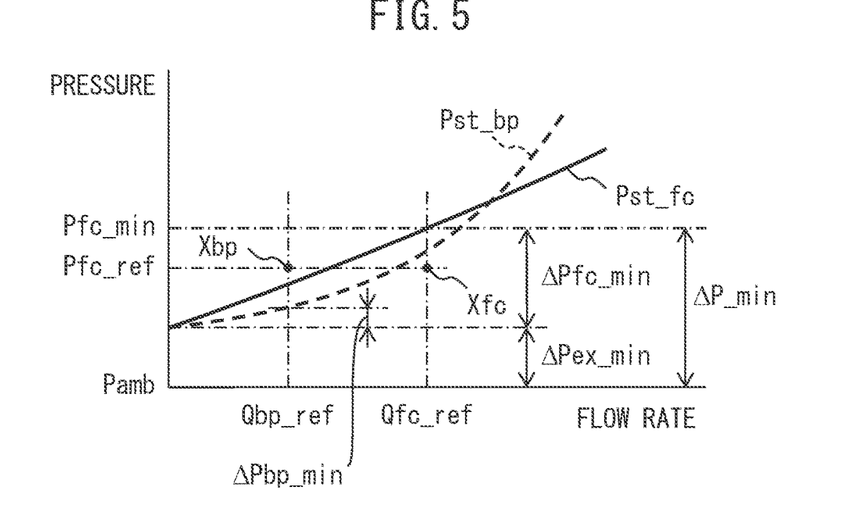
FIG. 5 is a graph for explaining an embodiment according to the present disclosure.

In FIG. 5, the FC pressure loss-lower limit value Pfc_min etc. in the case where the FC pressure loss-lower limit value ΔPfc_min is larger than the bypass pressure loss-lower limit value ΔPbp_min are shown. Note that, in FIG. 5, Pst_fc shows the stall line of the FC route Rfc while Pst_bp shows the stall line of the bypass route Rbp.

In the example shown in FIG. 5, the FC pressure loss-lower limit value ΔPfc_min is larger than the bypass pressure loss-lower limit value ΔPbp_min. Therefore, the FC inlet pressure-lower limit value Pfc_min in this example is expressed by ΔPfc_min+Pamb. Further, in the example shown in FIG. 5, the FC inlet pressure-command value Pfc_ref is smaller than the FC inlet pressure-lower limit value Pfc_min when the FC air flow rate is equal to the command value Qfc_ref. Therefore, the operating point Xfc on the FC route Rfc determined by the FC air flow rate-command value Qfc_ref and FC inlet pressure-command value Pfc_ref cannot be realized. Note that, in FIG. 5, Xbp show the operating point Xbp on the bypass route Rbp determined by the bypass air flow rate-command value Qbp_ref and FC inlet pressure-command value Pfc_ref.

When the operating point at the FC route Rfc cannot be realized, if feedback control of the opening degree θarv of the pressure regulating valve 24 provided at the FC route Rfc is continued, for example, the FB control deviation ΔAe_arv may be accumulated while the current value Qfc_mes of the pressure regulating valve-air flow rate remains off from the command value Qfc_ref (integral term (ki·∫(ΔAe_arv)dt) of FB control-command value Ae_arv_FB). The integral term obtained at this time may not accurately express steady deviation. Following feedback control of the pressure regulating valve-opening degree θarv may not be accurately performed.

Therefore, in an embodiment according to the present disclosure, when the FC inlet pressure-command value Pfc_ref is smaller than the FC inlet pressure-lower limit value Pfc_min, the feedback control of the pressure regulating valve-opening degree θarv is suspended if the FC pressure loss-lower limit value ΔPfc_min is larger than the bypass pressure loss-lower limit value ΔPbp_min. In one example, the FB control deviation ΔAe_arv of the pressure regulating valve-effective cross-sectional area is made zero. As a result, accurate feedback control of the pressure regulating valve-opening degree θarv following that is secured.

In this case, feedback control of the bypass valve-opening degree θabv is continued. As a result, not only the bypass air flow rate Qbp, but also the FC air flow rate Qfc continues to be controlled. However, in an embodiment according to the present disclosure, while the bypass valve pressure ratio feedback control is suspended, the bypass valve-flow rate feedback control is continued. In one example, in the calculation of the FB control deviation ΔAe_abv of the bypass valve-effective cross-sectional area, the partial differential term ∂Ae/∂Pr(dPrabv) of the bypass valve-pressure ratio deviation is made zero. As a result, the bypass valve-flow rate Qbp and FC air flow rate Qfc are more accurately controlled.

On the other hand, when the bypass pressure loss-lower limit value ΔPbp_min is larger than the FC pressure loss-lower limit value ΔPfc_min, the FC inlet pressure-command value Pfc_ref being smaller than the FC inlet pressure-lower limit value Pfc_min means that the operating point at the bypass route Rbp, that is, the operating point determined by the bypass air flow rate-command value Qbp_ref and the FC inlet pressure-command value Pfc_ref, cannot be realized.

In an embodiment according to the present disclosure, when the FC inlet pressure-command value Pfc_ref is smaller than the FC inlet pressure-lower limit value Pfc_min, the feedback control of the opening degree θabv of the bypass valve 28 provided in the bypass route Rbp is suspended when the bypass pressure loss-lower limit value ΔPbp_min is larger than the FC pressure loss-lower limit value ΔPfc_min. In one example, the FB control deviation ΔAe_abv of the bypass valve-effective cross-sectional area is made zero. As a result, accurate feedback control of the bypass valve-opening degree θabv following that is secured.

In this case, feedback control of the pressure regulating valve-opening degree θarv is continued. In an embodiment according to the present disclosure, while the pressure regulating valve pressure ratio feedback control is suspended, the pressure regulating valve-flow rate control is continued. In one example, in calculation of the FB control deviation ΔAe_arv of the pressure regulating valve-effective cross-sectional area, the partial differential term ∂Ae/∂Pr (dPrarv) of the pressure regulating valve-pressure ratio deviation is made zero. As a result, the bypass valve-flow rate Qbp and FC air flow rate Qfc are more accurately controlled.

In this regard, in actual control, if considering the variation in dimensions of the parts of the fuel cell system 1, detection error of the sensors, etc., it may be impossible to accurately judge if the FC inlet pressure-command value Pfc_ref is smaller than the FC inlet pressure-lower limit value Pfc_min. Therefore, in an embodiment according to the present disclosure, a first margin value α (>0) is added to the above-mentioned FC inlet pressure-lower limit value Pfc_min to thereby calculate the first threshold value Pth1. Then, when it is judged that the FC inlet pressure-command value Pfc_ref is smaller than the first threshold value Pth1, the feedback control of the pressure regulating valve-opening degree or the feedback control of the bypass valve-opening degree is suspended. As a result, the feedback control of the pressure regulating valve-opening degree and the feedback control of the bypass valve-opening degree are suitably executed or suspended. Note that, the first margin value α is for example 4 kPa or so. In another embodiment (not shown), the first threshold value Pth1 is calculated without adding the first margin value α.

Note that, in an embodiment according to the present disclosure, when it is judged that FC inlet pressure-command value Pfc_ref is equal to or larger than the first threshold value Pth1, feedback control of the pressure regulating valve-opening degree and feedback control of the bypass valve-opening degree are performed.

In this regard, when the pressure regulating valve-opening degree θarv is near the pressure regulating valve-maximum opening degree θarv_max, the change in the state quantity of the pressure regulating valve 24 (FC air flow rate Qfc and pressure regulating valve-pressure ratio Prarv) with respect to the change of the pressure regulating valve-opening degree θarv is small. For this reason, to change the state quantity of the pressure regulating valve 24 just slightly, the pressure regulating valve-opening degree θarv may greatly fluctuate. The same applies to the bypass valve 28.

On the other hand, as will be understood from the above-mentioned explanation, when it is judged that the FC inlet pressure-command value Pfc_ref is near the FC inlet pressure-lower limit value Pfc_min or is smaller than the same, if it is judged that the FC pressure loss-lower limit value ΔPfc_min is larger than the bypass pressure loss-lower limit value ΔPbp_min, the pressure regulating valve-opening degree θarv is near the maximum opening degree θarv_max. Therefore, in an embodiment according to the present disclosure, at this time, the pressure regulating valve-opening degree-command value θarv_ref is fixed to the maximum opening degree θarv_max. As a result, large fluctuation of the pressure regulating valve-opening degree θarv is limited. Therefore, the durability of the pressure regulating valve 24 is enhanced. On the other hand, control of the bypass valve-opening degree-command value θabv_ref is continued.

Conversely, when it is judged that FC inlet pressure-command value Pfc_ref is near the FC inlet pressure-lower limit value Pfc_min or is smaller than the same, if it is judged that the bypass pressure loss-lower limit value ΔPbp_min is larger than the FC pressure loss-lower limit value ΔPfc_min, the bypass valve-opening degree-command value θabv_ref is fixed to the maximum opening degree θabv_max while control of the pressure regulating valve-opening degree-command value θarv_ref is continued. As a result, large fluctuation of the bypass valve-opening degree θabv is limited and the durability of the bypass valve 28 is enhanced.

In this case, it may be impossible to accurately judge if FC inlet pressure-command value Pfc_ref is near the FC inlet pressure-lower limit value Pfc_min or is smaller than the same. Therefore, in an embodiment according to the present disclosure, a second margin value β (>0) is added to the FC inlet pressure-lower limit value Pfc_min to thereby calculate a second threshold value Pth2. Then, when it is judged that the FC inlet pressure-command value Pfc_ref is smaller than the second threshold value Pth2, the pressure regulating valve-opening degree-command value θavb_ref or the bypass valve-opening degree-command value θbp_ref is fixed to the maximum opening degree. As a result, the operation of fixing the pressure regulating valve-opening degree or the bypass valve-opening degree is suitably performed or suspended. Note that, the second margin value β is smaller than the above first margin value α, and, for example, is 0.1 kPa or so. In another embodiment (not shown), the second threshold value Pth2 is calculated without adding the second margin value β.

Figure 6:
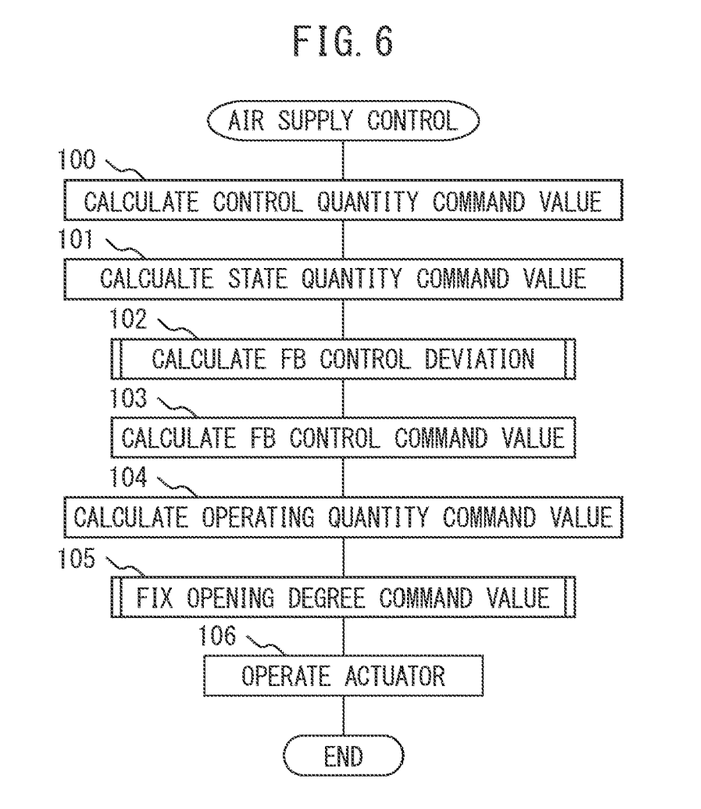
FIG. 6 is a flow chart showing a routine for air supply control of an embodiment according to the present disclosure.

FIG. 6 shows a routine for air supply control of an embodiment according to the present disclosure. The routine of FIG. 6 is repeatedly performed. Referring to FIG. 6, at step 100, control quantity command values are calculated. At the next step 101, state quantity-command values are calculated. At the next step 102, a routine for calculation of an FB control deviation is executed. This routine is shown in FIG. 7.

Figure 7:
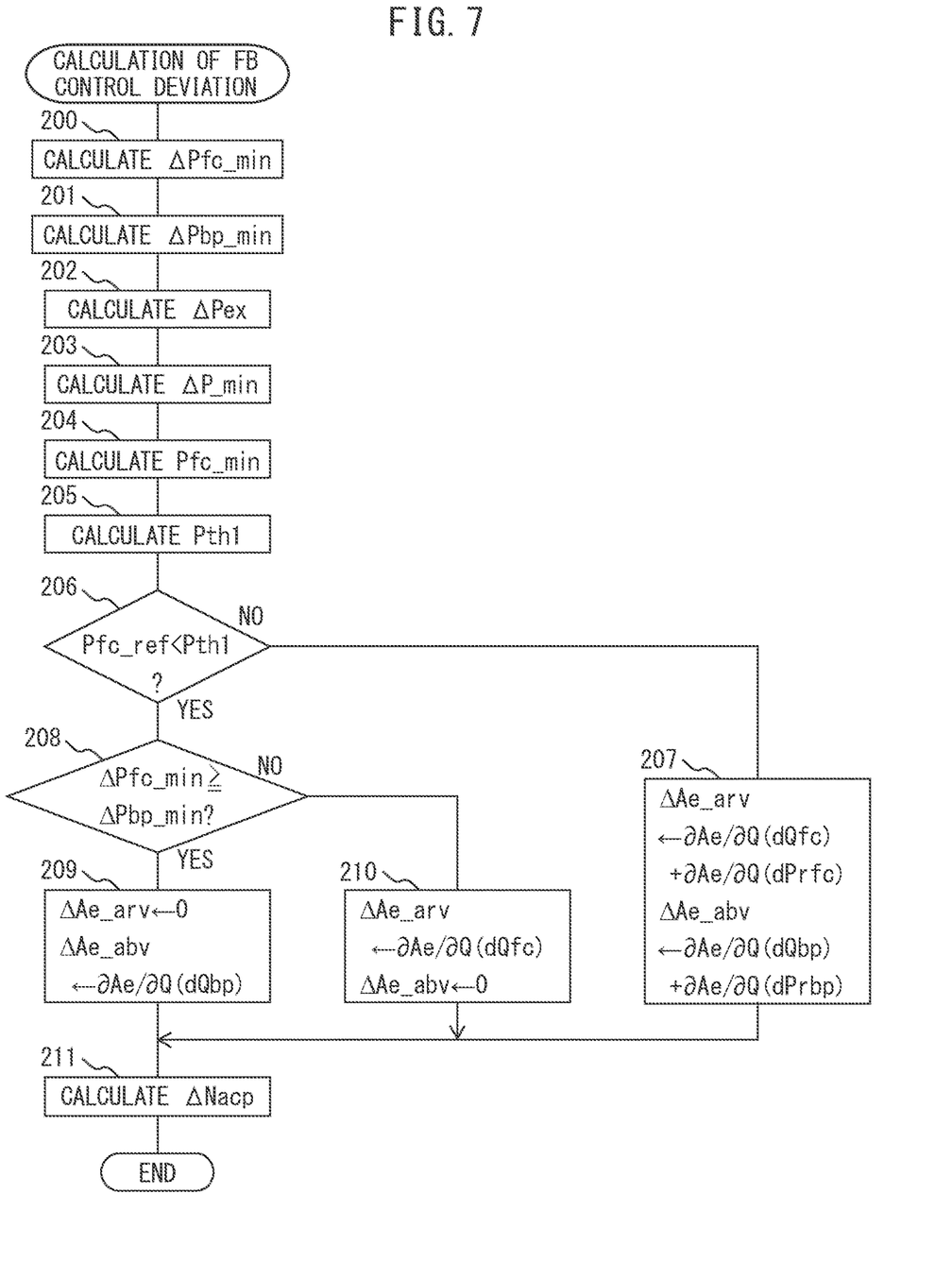
FIG. 7 is a flow chart showing a routine for calculation of FB control deviation of an embodiment according to the present disclosure.

Referring to FIG. 7, at step 200, a pressure loss-lower limit value ΔPfc_min of the FC route Rfc is calculated. At the next step 201, a pressure loss-lower limit value ΔPbp_min of the bypass route Rbp is calculated. At the next step 202, a pressure loss ΔPex of the air outflow path part 23ex is calculated. At the next step 203, a pressure loss-lower limit value ΔP_min is calculated. At the next step 204, an FC inlet pressure-lower limit value Pfc_min is calculated. At the next step 205, a first threshold value Pth1 is calculated.

At the next step 206, it is judged if the FC inlet pressure-command value Pfc_ref is smaller than the first threshold value Pth1. When Pfc_ref≥Pth1, next, the routine proceeds to step 207 where the FB control deviation ΔAe_arv of the pressure regulating valve-effective cross-sectional area is calculated using the pressure regulating valve-air flow rate deviation dQfc and the pressure regulating valve-pressure ratio deviation dPrarv. Further, the FB control deviation ΔAe_abv of the bypass valve-effective cross-sectional area is calculated using the bypass valve-air flow rate deviation dQbp and bypass valve pressure ratio deviation dPrabv. Next, the routine proceeds to step 211.

When Pfc_ref<Pth1, the routine proceeds from step 206 to step 208 where it is judged if the FC pressure loss-lower limit value ΔPfc_min is equal to or larger than the bypass pressure loss-lower limit value ΔPbp_min. When ΔPfc_min≥ΔPbp_min, next the routine proceed to step 209 where the FB control deviation ΔAe_arv of the pressure regulating valve-effective cross-sectional area is made zero. Further, the FB control deviation ΔAe_abv of the bypass valve-effective cross-sectional area is calculated using the bypass valve-air flow rate deviation dQbp without using the bypass valve-pressure ratio deviation dPrabv. Next, the routine proceeds to step 211.

When ΔPfc_min<ΔPbp_min, the routine proceeds from step 208 to step 210 where the FB control deviation ΔAe_arv of the pressure regulating valve-effective cross-sectional area is calculated using the pressure regulating valve-air flow rate deviation dQfc without using the pressure regulating valve-pressure ratio deviation dPrarv. Further, the FB control deviation ΔAe_abv of the bypass valve-effective cross-sectional area is made zero. Next, the routine proceeds to step 211.

At step 211, the FB control deviation ΔNacp of the compressor speed is calculated. Next, the routine proceeds to step 103 of the routine of FIG. 6.

Referring again to FIG. 6, at step 103, the FB control-command value is calculated. At the next step 104, the operation quantity-command value is calculated. At the next step 105, the routine for fixing the opening degree-command value is performed. This routine is shown in FIG. 8.

Figure 8:
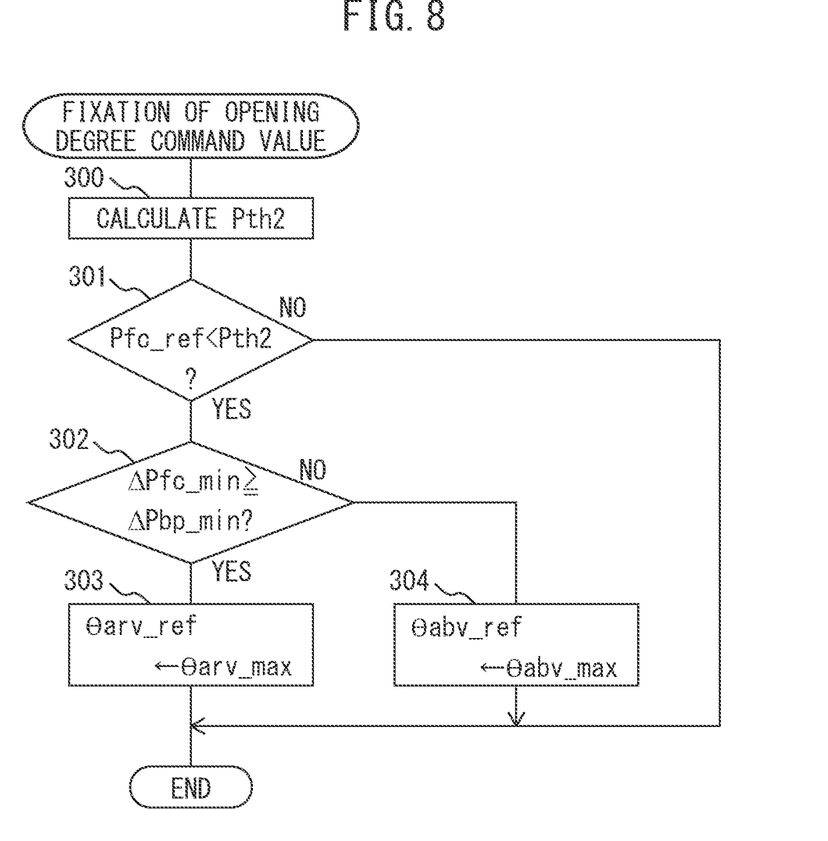
FIG. 8 is a flow chart showing a routine for fixing an opening degree-command value of an embodiment according to the present disclosure.

Referring to FIG. 8, at step 300, a second threshold value Pth2 is calculated. At the next step 301, it is judged if FC inlet pressure-command value Pfc_ref is smaller than the second threshold value Pth2. When Pfc_ref<Pth2, next, the routine proceeds to step 302 where it is judged if the FC pressure loss-lower limit value ΔPfc_min is equal to or larger than the bypass pressure loss-lower limit value ΔPbp_min. When ΔPfc_min≥ΔPbp_min, next the routine proceeds to step 303 where the pressure regulating valve-opening degree-command value θarv_ref is fixed to the pressure regulating valve-maximum opening degree θarv_max without the bypass valve-opening degree-command value θabv_ref being fixed. Next, the routine proceeds to step 106 of FIG. 6. As opposed to this, when ΔPfc_min<ΔPbp_min, the routine proceeds from step 302 to step 304 where the bypass valve-opening degree-command value θabv_ref is fixed to the bypass valve-maximum opening degree θabv_max without the pressure regulating valve-opening degree-command value θarv_ref being fixed. Next, the routine proceeds to step 106 of FIG. 6. When Pfc_ref≥Pth2, the routine proceeds from step 301 to step 106 of FIG. 6.

Referring again to FIG. 6, at step 106, the actuators are operated using the operation quantities.

This application claims the benefit of Japanese Patent Application No. 2020-094398, the entire disclosure of which is incorporated by reference herein.

REFERENCE SIGNS LIST 1. fuel cell system
10. fuel cell
10a. air passage
21. air inflow path
22. compressor
23. air outflow path
24. pressure regulating valve
25. diverging point
26. merging point
27. bypass passage
28. bypass valve
30. electronic control unit

The invention claimed is:

1. A fuel cell (FC) system comprising:
a fuel cell including an air passage;
an air inflow path connected to an inlet of the air passage;
an air outflow path connected to an outlet of the air passage;
a compressor arranged in the air inflow path;
a pressure regulating valve arranged in the air outflow path;
a bypass passage extending from a diverging point on the air inflow path downstream of the compressor to a merging point on the air outflow path downstream of the pressure regulating valve bypassing the fuel cell;
a bypass valve arranged in the bypass passage;
an FC route running from the diverging point successively through the air inflow path, air passage, and air outflow path including the pressure regulating valve to reach the merging point;
a bypass route running from the diverging point through the bypass air passage including the bypass valve to reach the merging point; and
an electronic control unit configured to respectively perform at least feedback control of an opening degree of the pressure regulating valve and feedback control of an opening degree of the bypass valve so that an FC air flow rate which is a flow rate of air of the FC route, a bypass air flow rate which is a flow rate of air of the bypass route, and an FC inlet pressure which is a pressure at the diverging point, are respectively equal to an FC air flow rate-command value, bypass air flow rate-command value, and FC inlet pressure-command value,
wherein the electronic control unit is further configured to:
calculate a first threshold value based on an FC inlet pressure-lower limit value which is a lower limit value of the FC inlet pressure when the FC air flow rate and the bypass air flow rate are respectively equal to the FC air flow rate-command value and the bypass air flow rate-command value;
when it is judged that the FC inlet pressure-command value is lower than the first threshold value,
suspend feedback control of the opening degree of the pressure regulating valve without suspending feedback control of the opening degree of the bypass valve if it is judged that an FC pressure loss-lower limit value is larger than a bypass pressure loss-lower limit value, the FC pressure loss-lower limit value being a lower limit value of the a pressure loss of the FC route when the FC air flow rate is equal to the FC air flow rate-command value, and the bypass pressure loss-lower limit value being a lower limit value of a pressure loss of the bypass route when the bypass air flow rate is equal to the bypass air flow rate-command value; and
suspend feedback control of the opening degree of the bypass valve without suspending feedback control of the opening degree of the pressure regulating valve if it is judged that the bypass pressure loss-lower limit value is larger than the FC pressure loss-lower limit value;
wherein the feedback control of the opening degree of the pressure regulating valve includes:
pressure regulating valve-air flow rate feedback control in which the opening degree of the pressure regulating valve is feedback controlled so that a pressure regulating valve-air flow rate is equal to a pressure regulating valve-air flow rate-command value, the pressure regulating valve-air flow rate being an air flow rate of the pressure regulating valve; and
pressure regulating valve pressure ratio feedback control in which the opening degree of the pressure regulating valve is feedback controlled so that a pressure regulating valve-pressure ratio is equal to a pressure regulating valve-pressure ratio-command value, the pressure regulating valve-pressure ratio being a ratio of an inlet pressure and outlet pressure of the pressure regulating valve;
the feedback control of the opening degree of the bypass valve includes:
bypass valve-air flow rate feedback control in which the opening degree of the bypass valve is feedback controlled so that a bypass valve-air flow rate is equal to a bypass valve-air flow rate-command value, the bypass valve-air flow rate being an air flow rate of the bypass valve; and
bypass valve-pressure ratio feedback control in which the opening degree of the bypass valve is feedback controlled so that a bypass valve-pressure ratio is equal to a bypass valve-pressure ratio-command value, the bypass valve-pressure ratio being a ratio of an inlet pressure and outlet pressure of the bypass valve;
wherein the pressure regulating valve-air flow rate-command value, the pressure regulating valve-pressure ratio, the bypass valve-air flow rate-command value, and the bypass valve-pressure ratio respectively are calculated based on at least the FC air flow rate-command value and the bypass air flow rate-command value, and
wherein the electronic control unit is further configured to:
when it is judged that the FC inlet pressure-command value is lower than the first threshold value,
execute the bypass valve-air flow rate feedback control while suspending the bypass valve-pressure ratio feedback control if it is judged that the FC pressure loss- lower limit value is larger than the bypass pressure loss-lower limit value; and execute the pressure regulating valve-air flow rate feedback control while suspending the pressure regulating valve-pressure ratio-feedback control if it is judged that the bypass pressure loss-lower limit value is larger than the FC pressure loss-lower limit value.

2. The fuel cell system according to claim 1 wherein the first threshold value is calculated based on a total of:
the larger of the FC pressure loss-lower limit value and the bypass pressure loss-lower limit value;
a pressure loss of the air outflow path from the merging point to the outlet when the FC air flow rate and the bypass air flow rate are respectively equal to the FC air flow rate-command value and the bypass air flow rate-command value; and
a predetermined margin value.

3. The fuel cell system according to claim 1, wherein the electronic control unit is further configured to:
calculate a second threshold value based on the FC inlet pressure-lower limit value; and
when it is judged that the FC inlet pressure-command value is lower than the second threshold value,
fix the opening degree of the pressure regulating valve at its maximum opening degree if it is judged that the FC pressure loss-lower limit value is larger than the bypass pressure loss-lower limit value and
fix the opening degree of the bypass valve at its maximum opening degree if it is judged that the bypass pressure loss-lower limit value is larger than the FC pressure loss-lower limit value.

4. A method of controlling a fuel cell system, the fuel cell system comprising:
a fuel cell including an air passage;
an air inflow path connected to an FC inlet of the air passage;
an air outflow path connected to an outlet of the air passage;
a compressor arranged in the air inflow path;
a pressure regulating valve arranged in the air outflow path;
a bypass passage extending from a diverging point on the air inflow path downstream of the compressor to a merging point on the air outflow path downstream of the pressure regulating valve bypassing the fuel cell;
a bypass valve arranged in the bypass passage;
an FC route running from the diverging point successively through the air inflow path, air passage, and air outflow path including the pressure regulating valve to reach the merging point; and
a bypass route running from the diverging point through the bypass air passage including the bypass valve to reach the merging point,
the method comprising respectively performing at least feedback control of an opening degree of the pressure regulating valve and feedback control of an opening degree of the bypass valve so that an FC air flow rate of a flow rate of air of the FC route, a bypass air flow rate of a flow rate of air of the bypass route, and an FC inlet pressure of a pressure at the diverging point respectively are equal to an FC air flow rate-command value, bypass air flow rate-command value, and FC inlet pressure-command value,
the method further comprising:
calculating a first threshold value based on an FC inlet pressure-lower limit value which is a lower limit value of the FC inlet pressure when the FC air flow rate and the bypass air flow rate are respectively equal to the FC air flow rate-command value and the bypass air flow rate-command value;
when it is judged that the FC inlet pressure-command value is lower than the first threshold value,
suspending feedback control of the opening degree of the pressure regulating valve without suspending feedback control of the opening degree of the bypass valve if it is judged that an FC pressure loss-lower limit value is larger than a bypass pressure loss-lower limit value, the FC pressure loss-lower limit value being a lower limit value of the pressure loss of the FC route when the FC air flow rate is equal to the FC air flow rate-command value, and the bypass pressure loss-lower limit value being a lower limit value of the pressure loss of the bypass route when the bypass air flow rate is equal to the bypass air flow rate-command value; and
suspending feedback control of the opening degree of the bypass valve without suspending feedback control of the opening degree of the pressure regulating valve if it is judged that the bypass pressure loss-lower limit value is larger than the FC pressure loss-lower limit value.

* * * * *